US007634300B2

(12) United States Patent
Bliss

(10) Patent No.: US 7,634,300 B2
(45) Date of Patent: Dec. 15, 2009

(54) DUAL HINGED DISPLAY MODULE FOR USE IN A MOBILE DEVICE

(75) Inventor: Stephen J. Bliss, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 635 days.

(21) Appl. No.: 11/460,711

(22) Filed: Jul. 28, 2006

(65) Prior Publication Data

US 2008/0026801 A1 Jan. 31, 2008

(51) Int. Cl.
*H04M 1/00* (2006.01)
(52) U.S. Cl. .................. 455/575.1; 455/566; 455/158.4
(58) Field of Classification Search .......... 455/575.1–4, 455/90.3, 128, 145, 158.4, 347, 550.1, 566, 455/5
See application file for complete search history.

(56) References Cited

U.S. PATENT DOCUMENTS

| 2003/0092401 | A1 | 5/2003 | Ikeuchi |
| 2005/0020325 | A1 | 1/2005 | Enger et al. |
| 2006/0099995 | A1 | 5/2006 | Kim et al. |
| 2006/0111160 | A1 | 5/2006 | Lin et al. |
| 2006/0148542 | A1 | 7/2006 | Oliver |

FOREIGN PATENT DOCUMENTS

| DE | 202005000268 U1 | 4/2005 |
| EP | 1542434 A1 | 6/2005 |
| JP | 2005229349 | 8/2005 |
| WO | WO03001775 | 1/2003 |
| WO | WO03047219 | 6/2003 |

OTHER PUBLICATIONS

International Search Report, International Application No. PCT/US2007/063436, Mailed: Oct. 23, 2007.
International Search Report mailed Jul. 3, 2008 in PCT/US2007/085449, filed Nov. 21, 2007.
"New Nokia N Series Trio—Nokia N92 News," http://news.mobile9.com/2005/11/new-nokia-n-series-trio-nokia-n92.
"Nokia N93 Device," http://www.nokiausa.com/phones/N93, 2006.
"LG shows another T-DMB swivel phone, the LB1500—Engadget Mobile," http://www.engadgetmobile.com/2006/04/14/lg-shows-another-t-dmb-swivel-phone-the-lb1500/.
"Samsung's new 3G swivel phone for China—Engadget Mobile," http://www.engadgetmobile.com/2006/03/04/samsungs-new-3g-swivel-phone-for-china.
"Kyocera's New Swivel Phone—Mobile Tracker," http://www.mobiletracker.net/archives/2003/04/26/kyoceras_new_s.php.
"Vodafone unveils mystery TV swivel phone—Mobile Phone News and Review," http://www.mobile-info.info/2006/03/vodafone_unveils_mystery_tv_sw.html.
"Siemens SF65 Swivel Phone © PhoneMag.com," http://www.phonemag.com/index.php/weblog/read_more/09162004_siemens_sf65_swivel_phone/, Sep. 16, 2004.

*Primary Examiner*—CongVan Tran
(74) *Attorney, Agent, or Firm*—Coats & Bennett, P.L.L.C.

(57) ABSTRACT

The mobile device described herein includes a display module. The display module rotates about one of two independent axes to provide different viewing angle options to the user. The mobile device includes a housing and a display module. The display module includes a display, first and second sides adjacent to the display, and first and second hinges associated with the first and second sides, respectively. The first hinge rotatably mounts the display module to the housing for rotation about a first axis. The second hinge rotatably mounts the display module to the housing for rotation about a second axis, independent of the first axis.

29 Claims, 8 Drawing Sheets

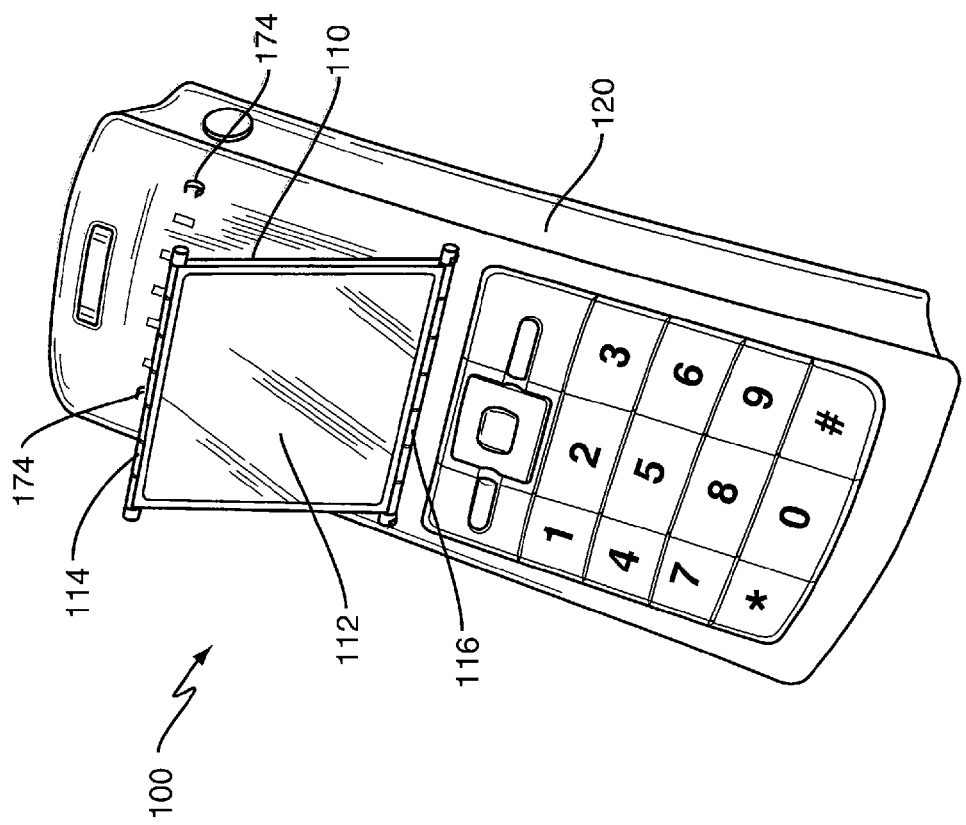
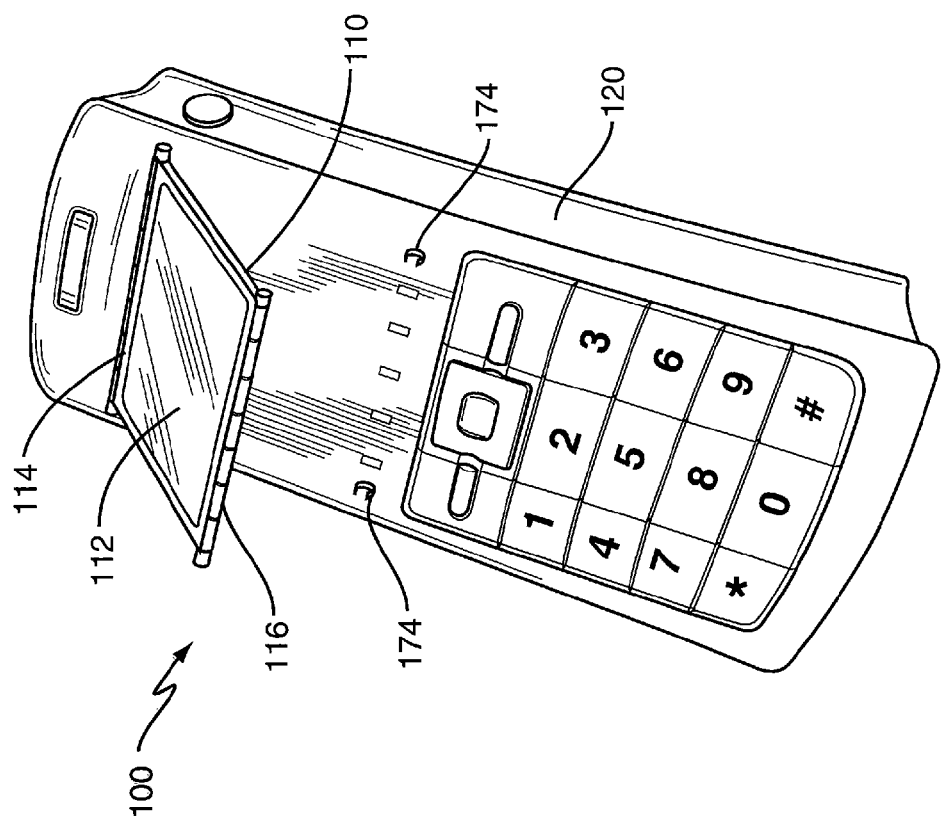
*FIG. 6B*
*FIG. 6A*

US 7,634,300 B2

DUAL HINGED DISPLAY MODULE FOR USE IN A MOBILE DEVICE

BACKGROUND

The present invention relates generally to mobile devices, and more particularly to mobile device displays.

Conventional mobile devices, such as mobile telephones, gaming devices, personal data assistants, etc., include one or more displays. By displaying information to the user, the display provides feedback to the user about current operations, past operations, and options for future operations.

On many devices, the orientation of the display relative to the housing is fixed. Some mobile devices, such as clamshell mobile telephones, include a display module that rotates in one direction relative to the housing. In all cases, the user's ability to orient the display is still generally limited. As such there remains a need for alternative displays for mobile devices.

SUMMARY

A display module for a mobile device according to the present invention rotates about two independent axes relative to a housing that substantially surrounds the display module to provide different viewing angle options to the user. According to one exemplary embodiment, the mobile device includes a housing and a display module. The display module includes a display, first and second sides adjacent to the display, and first and second hinges associated with the first and second sides, respectively. The first hinge is configured for rotating the display module relative to the housing about a first axis. The second hinge is configured for rotating the display module relative to the housing rotation about a second axis, independent from the first axis. In some embodiments, the first and second axes of rotation are generally parallel. In some embodiments, the first and second axes of rotation are generally perpendicular.

BRIEF DESCRIPTION OF THE DRAWINGS

FIGS. 6A and 6B show another exemplary mobile device according to the present invention.

DETAILED DESCRIPTION

Figure 1B:
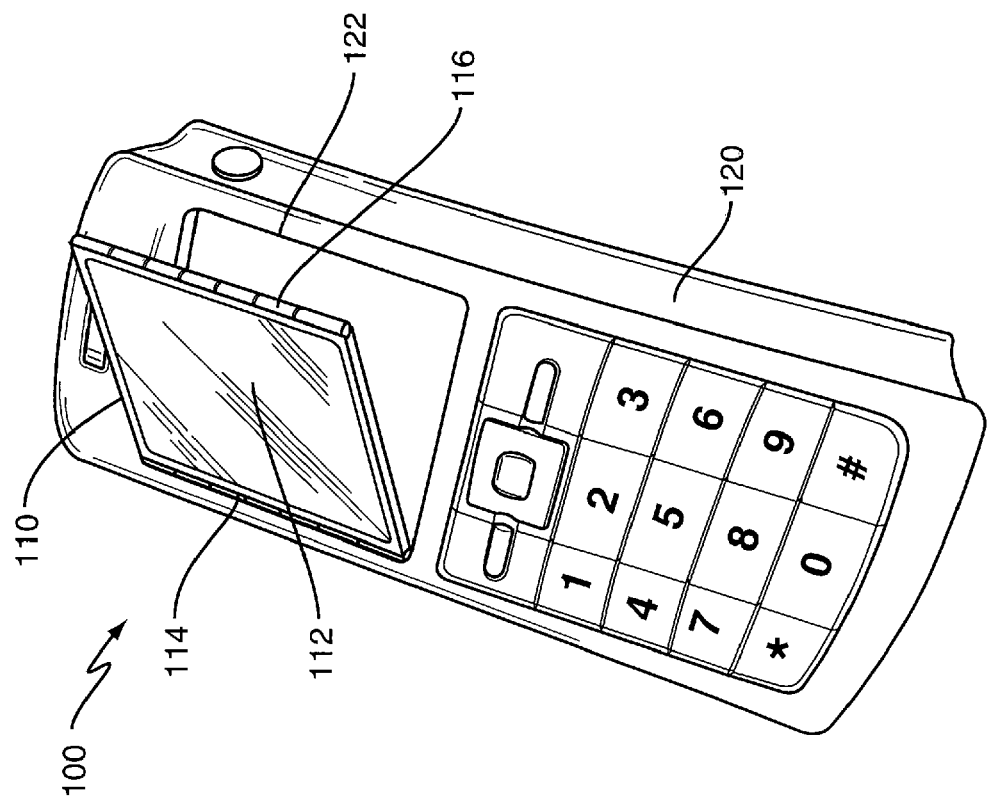
FIGS. 1A and 1B show an exemplary mobile device according to the present invention.
Figure 1A:
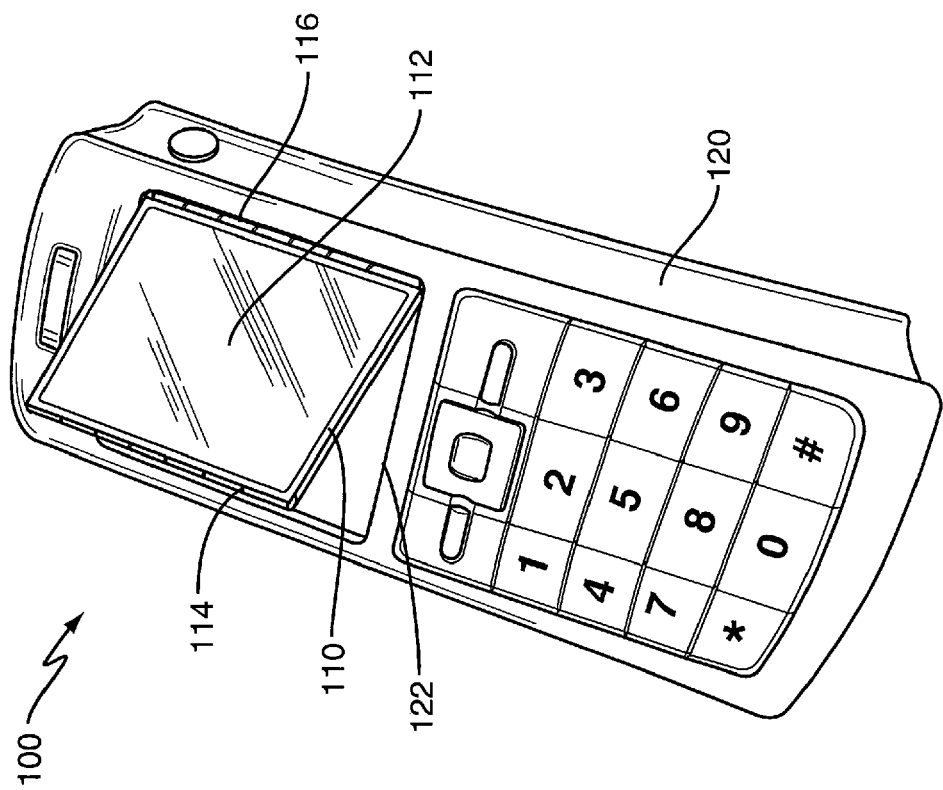

The present invention applies to any mobile device, including cellular telephones, personal data assistants, gaming devices, palmtop computers, etc. FIG. 1 shows one exemplary mobile device 100 having a display module 110 rotatably connected to a housing 120. When secured to the housing 120, at least a portion of the display module 110 rests within a recess 122 in the housing 120. As discussed in further detail below, display module 110 rotates relative to the housing surrounding the display about different axes of rotation. This enables the user to adjust the viewing angle of the display module 110 for a wide variety of purposes, including camera operations, display glare reduction, etc.

Figure 2:
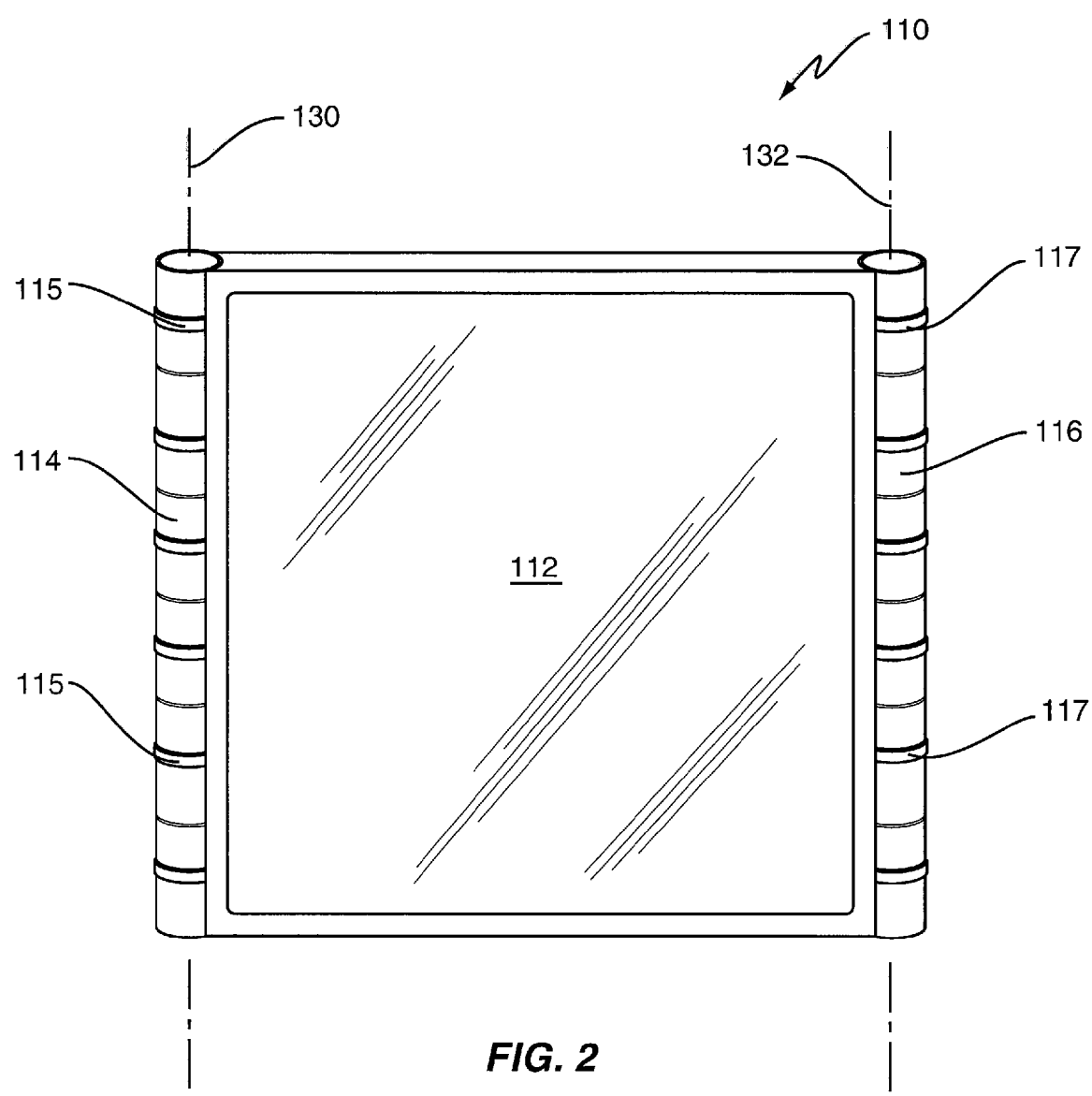
FIG. 2 shows an exemplary display module according to the present invention.

FIG. 2 shows one exemplary display module 110. Display module 110 includes a display 112 and two or more hinges 114, 116 disposed along two sides or edges of the display module 110. When both hinges 114, 116 are secured to the housing 120, display 112 faces outwardly from the mobile device 100 and is generally parallel with an external surface of housing 120. When only the left hinge 114 is secured to the housing 120, display module 110 is free to rotate to the left about an axis of rotation 130 associated with hinge 114. Similarly, when only the right hinge 116 is secured to housing 120, display module 110 rotates to the right about a different axis of rotation 132 associated with hinge 116. For the embodiment shown in FIGS. 1A, 1B, and 2, the axes of rotation 130, 132 are generally parallel and on opposing sides of display module 110. However, it will be appreciated that this is not required, as discussed further below.

Each hinge 114, 116 includes a set of one or more electrical contacts 115, 117, herein referred to as "hinge contacts," that electrically connect to display 112. When at least one of the hinges 114, 116 is secured to housing 120, hinge contacts 115, 117 align with and electrically connect to a corresponding set of one or more electrical contacts 124, 126 (see FIGS. 3, 4A, and 5A) disposed on housing 120, herein referred to as "housing contacts." As a result, when at least one hinge 114, 116 is secured to housing 120, display 112 electrically connects to the mobile device 100. It will be appreciated that a left set of housing contacts 124 aligns with the hinge contacts 115 on left hinge 114, and that a right set of housing contacts 126 aligns with the hinge contacts 117 on right hinge 116.

Figure 3:
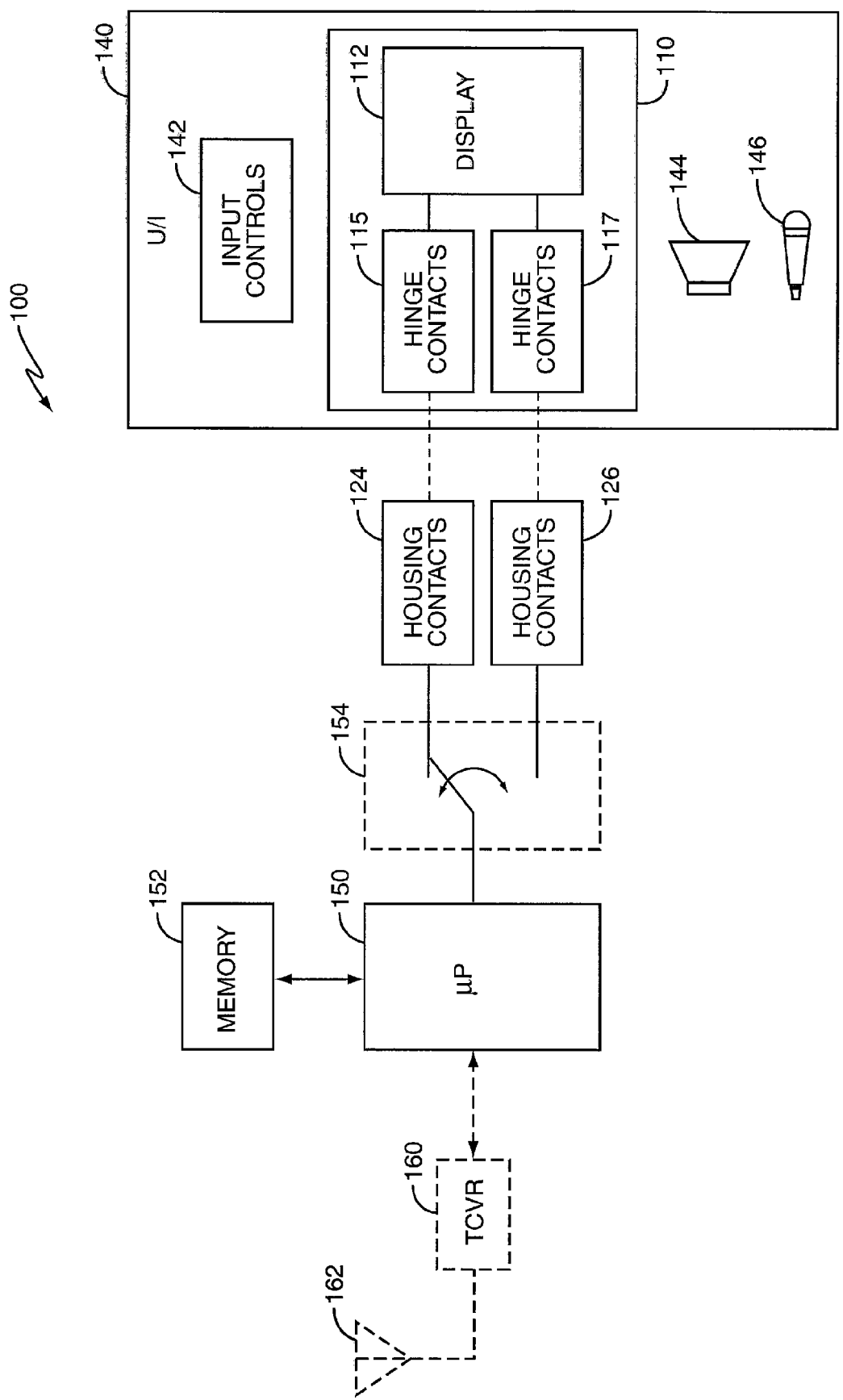
FIG. 3 shows an exemplary block diagram for the mobile device of FIG. 1.
Figure 4A:
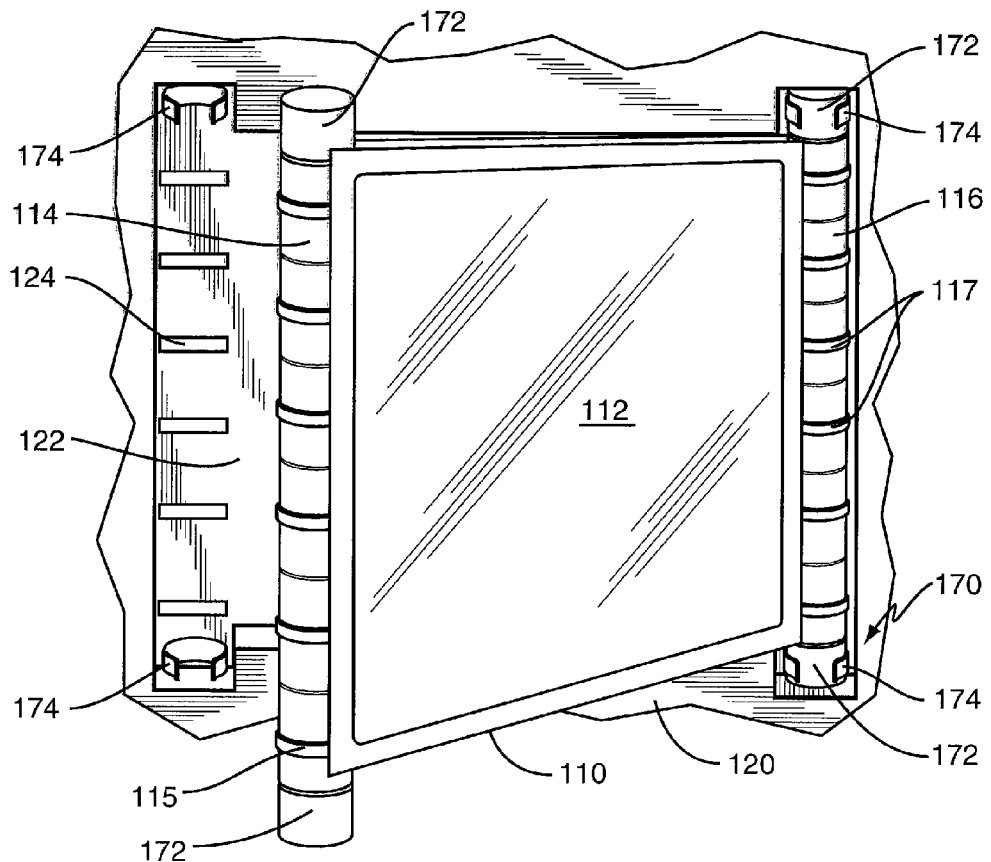
FIGS. 4A and 4B show an exemplary locking mechanism for the display module of the present invention.

FIG. 3 shows an exemplary block diagram for mobile device 100. Mobile device 100 includes a user interface 140, processor 150, memory 152, and housing contacts 124, 126. User interface 140 enables the user to interact with the mobile device 100. In addition to display module 110, user interface 140 includes one or more input controls 142, a speaker 144, and a microphone 146. Processor 150 performs various processing tasks, including control of the overall operation of mobile device 100, according to data and programs stored in memory 152. Those skilled in the art will appreciate that processor 150 may be embodied in hardware and/or in software (including firmware, resident software, micro-code, etc.), including an application specific integrated circuit (ASIC). When mobile device 100 is a mobile communication device, such as a cellular telephone, mobile device 100 may also include a transceiver 160 and antenna 162. Transceiver 160 may operate according to any known standard. Exemplary communication standards include but are not limited to, Code Division Multiple Access (CDMA), Global System for Mobile Communications (GSM), Universal Mobile Telecommunications System (UMTS), Orthogonal Frequency Division Multiplexing (OFDM), etc.

As discussed above, housing contacts 124, 126 are configured to align and mate with hinge contacts 115, 117. As a result, securing at least one hinge 114, 116 to the housing 120 electrically connects display 112 to processor 150 by electrically connecting at least one set of hinge contacts 115, 116 to the corresponding set of housing contacts 124, 126. Processor 150 controls the information displayed on display 112 according to any known means using this electrical connection. According to one embodiment (not shown), processor 150 may be permanently connected to all housing contacts 124, 126. As a result, when any set of hinge contacts 115, 117 electrically connect to any set of housing contacts 124, 126, display 112 is electrically connected to processor 150.

According to another embodiment, mobile device 100 may include a switch 154 that selectively connects processor 150 to one set of housing contacts 124, 126 based on the mode of rotation of display module 110. Processor 150 may determine the mode of rotation of display module 110 using any known means. For example, processor 150 may determine that one hinge 114, 116 is secured to housing 120 by detecting the presence of an electrical signal on one of the housing contacts 124, 126. Alternatively, processor 150 may determine the mode of rotation based on a mechanical switch (not shown) that is activated when a hinge 114, 116 is secured to the housing 120, and deactivated when the hinge 114, 16 is separated from the housing 120.

Based on the determined mode of rotation, processor 150 controls switch 154. For example, when processor 150 determines that only the left hinge 114 is secured to housing 120, processor 150 connects switch 154 to the left housing contacts 124, which are in electrical contact with the left hinge contacts 115, to electrically connect display 112 to processor 150. Similarly, when processor 150 determines that only the right hinge 116 is secured to housing 120, processor 150 connects switch 154 to the right housing contacts 126, which are in electrical contact with the left hinge contacts 117, to electrically connect display 112 to processor 150. When processor 150 determines that both hinges 114, 116 are secured to housing 120, processor 150 connects switch 154 to either the left housing contacts 124 or the right housing contacts 126 based on a pre-defined default setting.

Figure 4B:
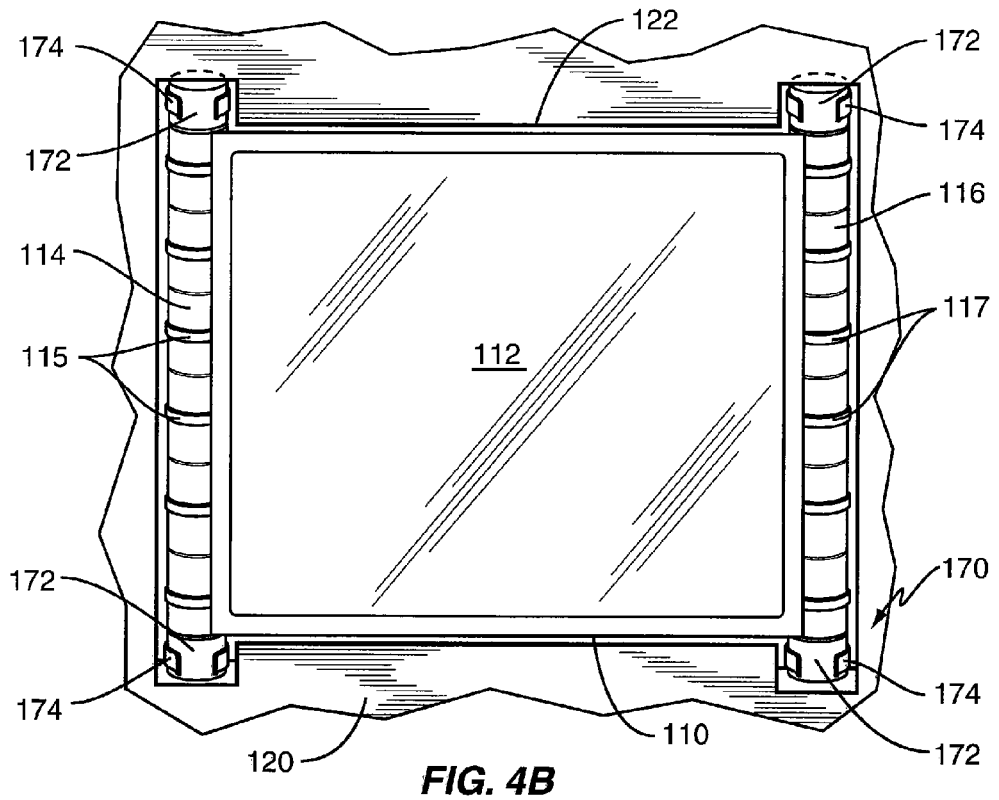

The present invention uses one or more locking mechanisms 170 to releasably secure each hinge 114, 116 to the housing 120. In the embodiment shown in FIGS. 4A and 4B, each locking mechanism 170 comprises a clip locking mechanism 170 that includes an end cap 172 and a clip 174. At least one end of each hinge 114, 116 has an end cap 172 secured thereon. A corresponding clip 174 is secured to the housing 120 such that each clip 174 aligns with an end cap 172. When pushed into clip 174, the end cap 172 snaps into the clip 174 to frictionally secure the hinge 114, 116 to the housing 120. To release a hinge 114, 116 from the housing 120, the user pulls on the desired hinge 114, 116 in a generally outward direction to pull the corresponding end cap(s) 172 from the clip(s) 174. While not explicitly shown, display module 110 and/or housing 120 may include some additional feature to facilitate removing a hinge 114, 116 from the locking mechanism(s) 170, such as a pull tab, finger indentation, etc.

Figure 5A:
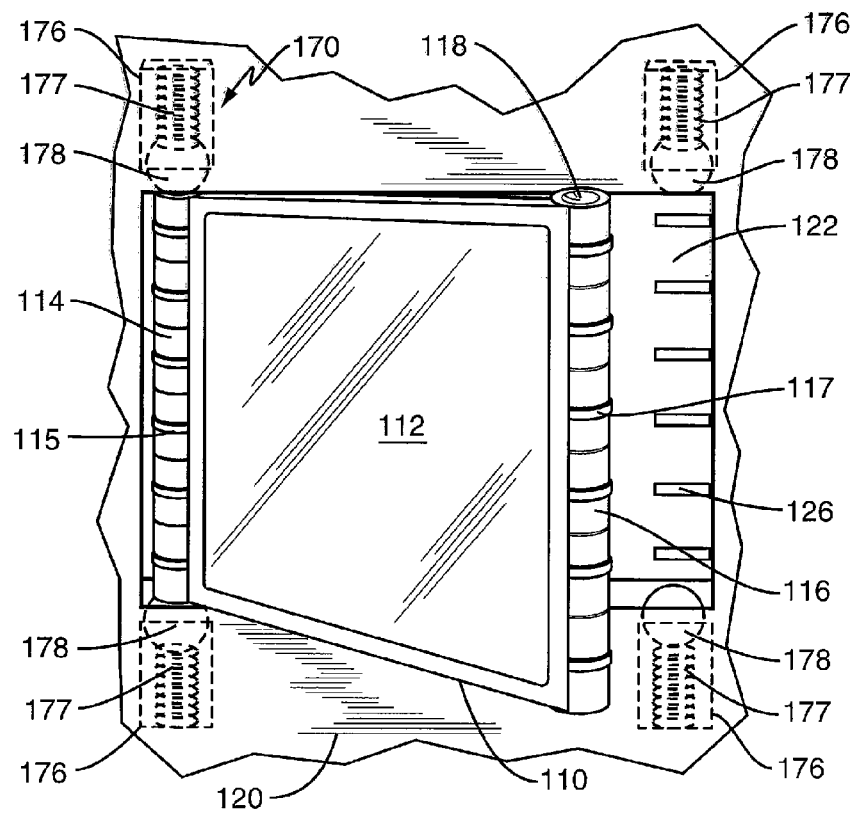
FIGS. 5A and 5B show another exemplary locking mechanism for the display module of the present invention.
Figure 5B:
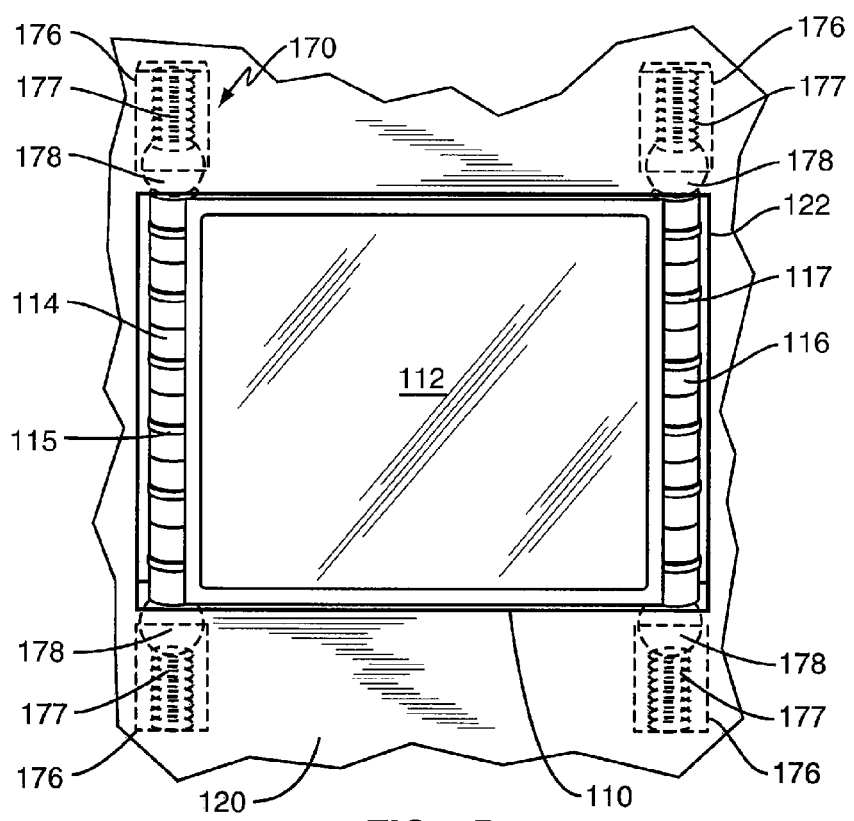

FIGS. 5A and 5B show another exemplary locking mechanism 170. According to this embodiment, each locking mechanism 170 comprises a detent locking mechanism 170. An exemplary detent locking mechanism 170 includes a cylinder 176 secured to an edge of recess 122, and a ball 178 and spring 177 secured within the cylinder 176. Spring 177 and ball 178 can move within cylinder 176 in a generally vertical direction. The ball 178 partially protrudes from the cylinder 176 due to the pressure exerted on the ball 178 by spring 177. When a hinge 114, 116 of display module 110 is pushed between two opposing detent locking mechanisms 170, ball 178 snaps into an indentation 118 on each end of the hinge 114, 116 and pushes against the indentation 118 responsive to the force exerted by spring 177. The opposing forces exerted on the opposing ends of the hinge 114, 116 by the opposing detent locking mechanisms 170 secure the hinge 114, 116 to the housing 120. To release a hinge 114, 116 from the housing 120, the user pulls on the desired hinge 114, 116 in a direction generally perpendicular to the direction of the opposing forces generated by the detent locking mechanisms 170. Like with the clip locking mechanism 170, display module 110 and/or housing 120 may include some additional feature to facilitate removing a hinge 114, 116 from the detent locking mechanism 170, such as a pull tab, finger indentation, etc.

Figure 7B:
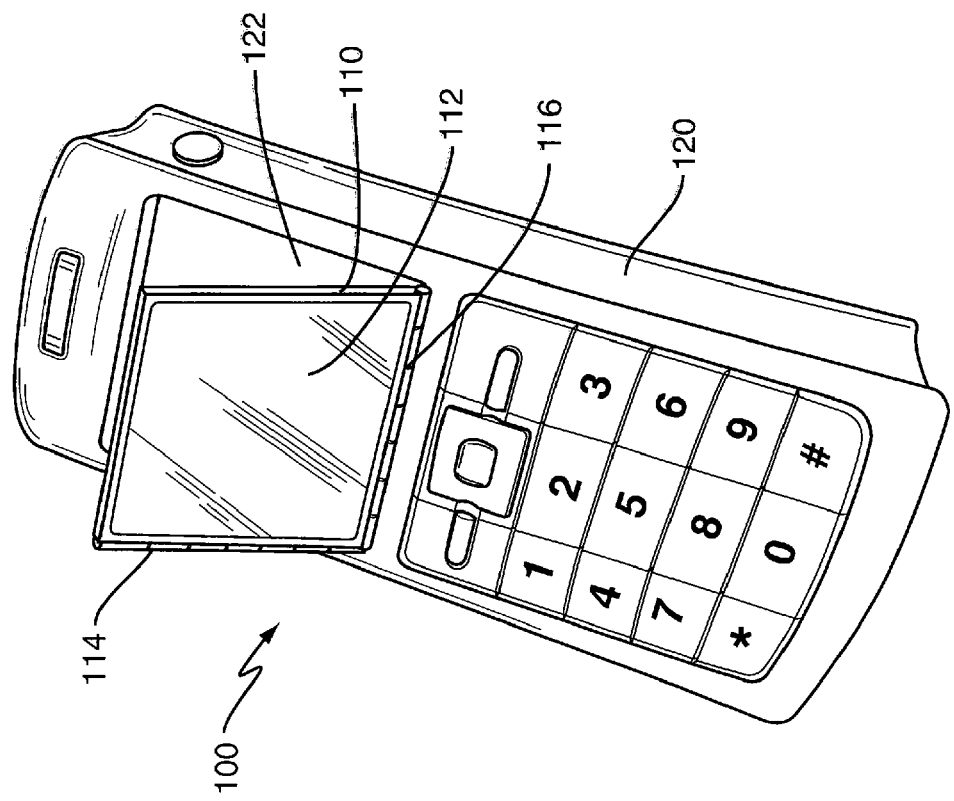
FIGS. 7A and 7B show another exemplary mobile device according to the present invention.
Figure 7A:
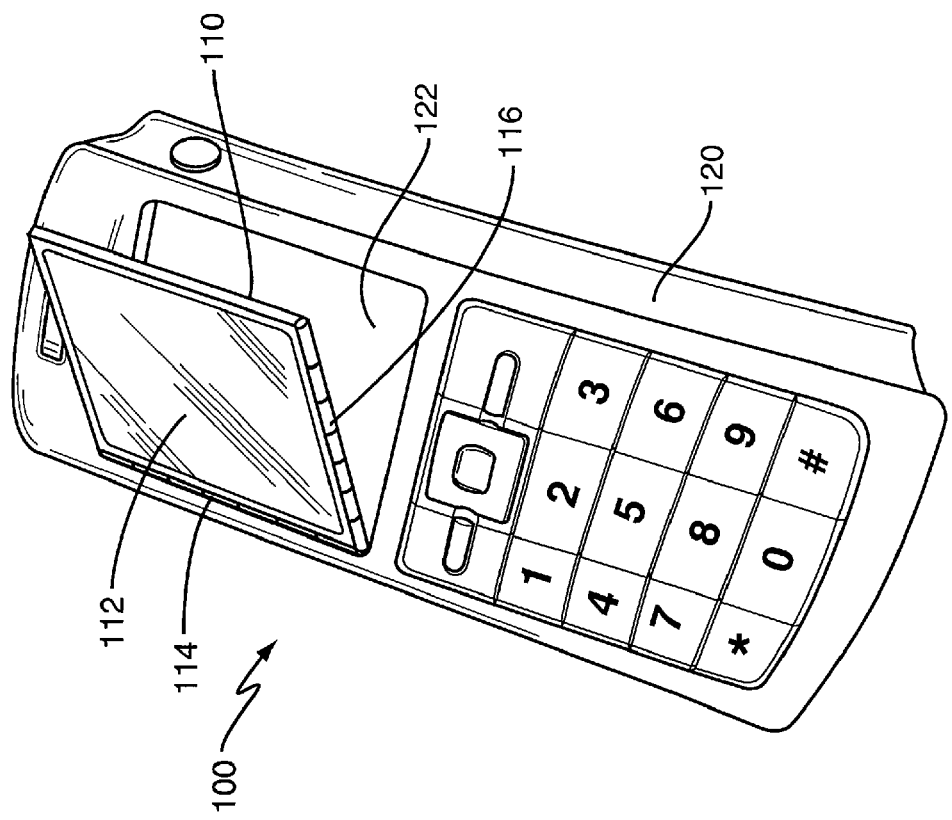

The above describes the invention in terms of a display module 110 having hinges 114, 116 along a left and right side of a display module 110 that enable the display to be independently rotated about generally parallel axes of rotation. However, the present invention is not so limited. As shown in FIGS. 6A and 6B, hinges 114, 116 may be disposed along opposing top and bottom sides or edges of display module 110 to enable display 112 to rotate upwardly or downwardly. Alternatively, as shown in FIGS. 7A and 7B, hinges 114, 116 may be disposed along adjacent sides or edges of the display module 110 to enable display 112 to rotate along non-parallel and generally perpendicular axes of rotation. It will further be appreciated that display module 110 may include hinges along more than two sides to allow rotation along more than two axes. For example, display module 110 may include hinges along three sides or along all four sides to allow display 112 to rotate in three or more directions.

Figure 8B:
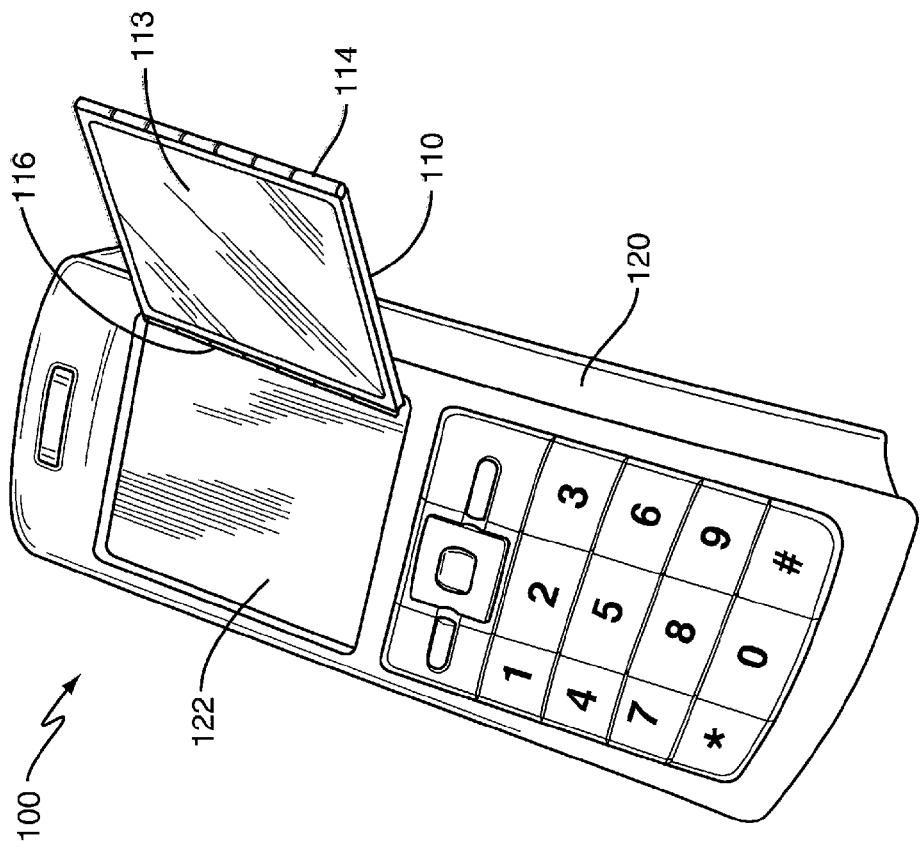
FIGS. 8A and 8B show another exemplary mobile device according to the present invention.
Figure 8A:
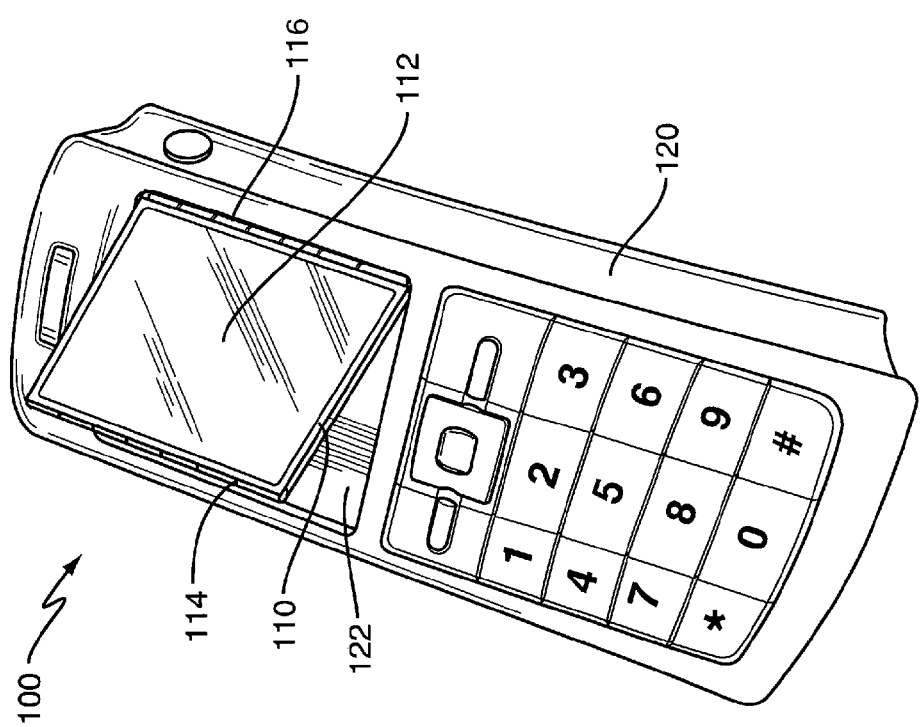

As discussed above, display module 110 includes a display 112 that faces outwardly from the mobile device 100 when the hinges 114, 116 are secured to housing 120. It will be appreciated that display module 110 may further include a second display 113 on an opposing back side of the display module 110, as shown in FIGS. 8A and 8B. According to this embodiment, hinge contacts 115, 117 may connect to both displays 112, 113. Alternatively, each hinge 114, 116 may include a separate set of contacts for each display 112, 113, where each set of contacts aligns with and mates with a separate set of housing contacts. When both hinges 114, 116 are secured to housing 120, only the front display 112 is visible. However, both displays 112, 113 are visible when the display module 110 is rotated about one of the hinges 114, 116. This embodiment enables one or more users to view the displayed information from either side of a rotated display module 110.

It will further be appreciated that while the above describes the display module 110 as it relates to a recess 122 in housing 120, the inventive display module 110 is not required to be associated with a recess 122. Display module 110 may alternatively rest on top of housing 120, as shown in FIGS. 6A and 6B, or form some other part of mobile device 100.

The above also describes the invention in terms of a rotating display module having hinges fixedly secured to two or more sides of the display module, where the hinges are releasably secured to the housing. However, it will be appreciated that the hinges may alternatively be fixedly secured to the housing and releasable secured to two or more sides of the display module.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A mobile device comprising:
  a housing; and
  a display module comprising:
    a display;
    first and second sides adjacent to the display and disposed along opposing sides of the display;

a first hinge associated with the first side and configured to rotatably mount the display module to the housing for rotation about a first axis; and a second hinge associated with the second side and configured to rotatably mount the display module to the housing for rotation about a second axis.

2. The mobile device of claim 1 wherein the first and second axes of rotation are generally parallel.

3. The mobile device of claim 1 further comprising:
one or more first locking mechanisms configured to releasably secure the first hinge to the housing; and
one or more second locking mechanisms configured to releasably secure the second hinge to the housing.

4. The mobile device of claim 3 wherein the first and second locking mechanisms comprise a detent locking mechanism or a clip locking mechanism.

5. The mobile device of claim 1 wherein when the display rotates about the first axis, the display module is in a first mode of rotation where the first hinge is securely held to the housing while the second hinge is released and moves with the display, wherein when the display rotates about the second axis, display module is in a second mode of rotation where the second hinge is securely held to the housing while the first hinge is released and moves with the display, and wherein the first and second hinges are both securely held to the housing when the display module is in a third mode of rotation.

6. The mobile device of claim 5 wherein the housing includes a recess, wherein the display module extends outwardly from the recess when the display module is in one of the first and second modes of rotation, and wherein the display module rests at least partially within the recess when the display module is in the third mode of rotation.

7. The mobile device of claim 1 wherein the display module comprises another display, wherein one display is disposed on a front side of the display module, wherein the other display is disposed on an opposing back side of the display module, and wherein the first and second sides are adjacent to both displays.

8. The mobile device of claim 1 further comprising one or more electrical contacts associated with the first and second hinges.

9. The mobile device of claim 8 wherein the one or more electrical contacts are disposed on an external portion of the first and second hinges and electrically connected to the display.

10. The mobile device of claim 8 further comprising:
a processor; and
a switch configured to selectively switch between the one or more electrical contacts associated with the first and second hinges.

11. The mobile device of claim 10 wherein the switch is configured to connect the processor to the one or more electrical contacts associated with one of the first and second hinges based on a mode of rotation associated with the display module.

12. The mobile device of claim 10 wherein the switch is configured to:
selectively connect the processor to the one or more electrical contacts associated with the first hinge when the display module rotates about the first axis; and
selectively connect the processor to the one or more electrical contacts associated with the second hinge when the display module rotates about the second axis.

13. The mobile device of claim 1 wherein the first and second hinges are secured to the first and second sides, respectively.

14. A method of mounting a display module on a mobile device, the method comprising:
disposing a display on the display module, wherein first and second sides of the display module are adjacent to the display and disposed along opposing sides of the display;
rotatably mounting the first side of the display module to a housing of the mobile device using a first hinge configured to rotate the display module about a first axis; and
rotatably mounting the second side of the display module to the housing using a second hinge configured to rotate the display module about a second axis.

15. The method of claim 14 wherein the first and second axes of rotation are generally parallel.

16. The method of claim 14 further comprising:
releasably securing the first hinge to the housing using one or more first locking mechanisms; and
releasably securing the second hinge to the housing using one or more second locking mechanisms.

17. The method of claim 16 wherein releasable securing at least one of the first and second hinges comprises securing one of the first and second hinges to the housing while the other of the first and second hinges is released from the housing.

18. The method of claim 14 further comprising:
securely holding the first hinge to the housing and releasing the second hinge to rotate about the first axis when the display module is in a first mode of rotation;
securely holding the second hinge to the housing and releasing the first hinge to rotate about the second axis when the display module is in a second mode of rotation; and
securely holding the first and second hinges to the housing when the display module is in a third mode of rotation.

19. The method of claim 14 further comprising disposing another display on the display module, wherein one display is disposed on a front side of the display module, wherein the other display is disposed on an opposing back side of the display module, and wherein the first and second sides are adjacent to both displays.

20. The method of claim 14 further comprising associating one or more electrical contacts with the first and second hinges.

21. The method of claim 20 wherein associating the one or more electrical contacts with the first and second hinges comprises:
disposing one or more electrical contacts on an external portion of the first and second hinges; and
electrically connecting the one or more contacts on the first and second hinges to the display.

22. The method of claim 20 further comprising selectively switching between the one or more electrical contacts associated with the first and second hinges based on a mode of rotation associated with the display module.

23. The method of claim 22 wherein selectively switching between the one or more electrical contacts comprises:
selectively connecting a processor to the one or more electrical contacts associated with the first hinge when the display module rotates about the first axis; and
selectively connecting the processor to the one or more electrical contacts associated with the second hinge when the display module rotates about the second axis.

24. A method of mounting a display on a mobile device, comprising:
positioning a display module having a display on a housing of the mobile device, such that the housing substantially surrounds the display module;

rotating the display with respect to the housing substantially surrounding the display module about a first axis associated with a first hinge assembly disposed along a first side of the display; and rotating the display with respect to the housing substantially surrounding the display module about a second axis associated with a second hinge assembly disposed along a second side of the display, wherein the first and second hinges are disposed along opposing sides of the display.

25. The method of claim 24 including employing at least two separate electrical contacts for directing electrical current to the display, at least one electrical contact being operative when the display is rotated about the first axis and at least one other electrical contact being operative when the display is rotated about the second axis.

26. The method of claim 24 wherein the first and second axes extend generally in parallel relationship.

27. The method of claim 24 including releasably securing the display module to the housing such that in at least one mode the display module is releasably secured to the housing about both first and second axes.

28. The method of claim 24 including securing a pair of hinged assemblies to the display module such that when the display rotates about the first axis, one of the hinge assemblies moves with the display, and when the display rotates about the second axis, the other hinge assembly moves with the display.

29. The method of claim 28 including releasably securing both hinge assemblies to the mobile device.

* * * * *

UNITED STATES PATENT AND TRADEMARK OFFICE
CERTIFICATE OF CORRECTION

PATENT NO. : 7,634,300 B2  Page 1 of 1
APPLICATION NO. : 11/460711
DATED : December 15, 2009
INVENTOR(S) : Stephen J. Bliss It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 775 days.

Signed and Sealed this

Ninth Day of November, 2010

David J. Kappos
*Director of the United States Patent and Trademark Office*